(12) United States Patent
Wang et al.

(10) Patent No.: US 10,719,696 B2
(45) Date of Patent: Jul. 21, 2020

(54) GENERATION OF INTERRELATIONSHIPS AMONG PARTICIPANTS AND TOPICS IN A VIDEOCONFERENCING SYSTEM

(71) Applicant: International Business Machines Corporation, Armonk, NY (US)

(72) Inventors: Wen Wang, Beijing (CN); Yan Bin Fu, Ningbo (CN); Shuang Yin Liu, Beijing (CN); Yi Wu, Ningbo (CN); Qing Jun Gao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 15/957,847

(22) Filed: Apr. 19, 2018

(65) Prior Publication Data
US 2019/0325202 A1 Oct. 24, 2019

(51) Int. Cl.
*G06K 9/00* (2006.01)
*H04N 7/15* (2006.01)

(52) U.S. Cl.
CPC ..... *G06K 9/00302* (2013.01); *G06K 9/00677* (2013.01); *G06K 9/00744* (2013.01); *H04N 7/15* (2013.01)

(58) Field of Classification Search
CPC ........... G06K 9/00302; G06K 9/00677; G06K 9/00744; H04N 7/15
See application file for complete search history.

(56) References Cited

U.S. PATENT DOCUMENTS

| | | | |
|---|---|---|---|
| 6,879,709 B2 | 4/2005 | Tian et al. | |
| 8,670,018 B2 | 3/2014 | Cunnington et al. | |
| 9,531,998 B1 | 12/2016 | Farrell et al. | |
| 2011/0292162 A1 | 12/2011 | Byun et al. | |
| 2011/0295392 A1* | 12/2011 | Cunnington | G06Q 10/10 700/90 |
| 2016/0042226 A1* | 2/2016 | Cunico | H04N 7/147 382/103 |
| 2016/0042281 A1* | 2/2016 | Cunico | H04L 65/403 706/11 |
| 2016/0042648 A1 | 2/2016 | Kothuri | |
| 2017/0006258 A1 | 1/2017 | Farrell et al. | |
| 2018/0331842 A1* | 11/2018 | Faulkner | H04L 12/1831 |

OTHER PUBLICATIONS

Wikipedia, "Microexpression", dated Apr. 2018, (online) retrieved from the Internet at URL>https://en.wikipedia.org/wiki/Microexpression, Total 4 pages.

* cited by examiner

*Primary Examiner* — Ping Y Hsieh
(74) *Attorney, Agent, or Firm* — Rabindranath Dutta; Konrad, Raynes, Davda and Victor LLP

(57) ABSTRACT

A computational device stores a plurality of audiovisual recordings comprising presentations made during a videoconference and visual reactions of attendees. A data collection model is generated at a conference level, a topic level, and an attendee level. A level of interest of an attendee to a topic or a speaker is determined from data collected in the data collection model at the conference level, the topic level and the attendee level. The determined level of interest of attendees to topics or speakers is displayed in a data structure.

20 Claims, 9 Drawing Sheets

Multi-dimensional analysis to generate interrelationship graph

➤ Attendee - Topic Connection — 702

| Attendee | Topic Concept | Conf # | Micro Emotional Feedbacks |
|---|---|---|---|
| Tom | DB Encrypt | 1, 4, 6, 8 | #1 - (60, 63, 64, 74, 76, 86, 40)<br>#4 - (13, 14, 15, 17, 18, 20, 10, 30)<br>#6 - () |

➤ Attendee - Attendee Connection — 704

| Speaker | Attendee | Micro Emotional Feedbacks |
|---|---|---|
| Tom | Bob | #1 - (60, 63, 64, 74, 76, 86, 40)<br>#4 - (50, 61, 67, 77, 76, 86, 50)<br>#6 - (40, 63, 62, 54, 66, 36, 40)<br>#8 - (60, 64, 63, 54, 56, 46, 50) |
|  | Alice | #1 - (40, 23, 44, 74, 76, 86, 40)<br>#4 - (30, 41, 57, 57, 56, 76, 50)<br>#6 - (40, 63, 62, 54, 66, 36, 40)<br>#8 - (20, 64, 63, 54, 56, 46, 50) |

Interrelationship Graph

FIG. 7

GENERATION OF INTERRELATIONSHIPS AMONG PARTICIPANTS AND TOPICS IN A VIDEOCONFERENCING SYSTEM

BACKGROUND

1. Field

Embodiments relate to the generation of interrelationships among participants and topics in a videoconferencing system.

2. Background

A videoconferencing system may allow the use of video telephones, computers, mobile phones, or other communication devices to allow participants at different locations to communicate among themselves. A video server of a videoconferencing system is a computer-based device dedicated to delivering video where the video may be displayed simultaneously or on demand to one or more devices that are coupled over a wired or wireless network to the video server. Sound including speech, music, etc., may form a part of the video.

The videoconferencing system may be used for presentations in which a group of participants may participate. An individual may provide a live presentation, or a pre-recorded presentation may be delivered from the video server. Other individuals may participate in live discussion during the delivery of the live or pre-recorded presentation.

SUMMARY OF THE PREFERRED EMBODIMENTS

Provided are a method, a system, and a computer program product in which a computational device stores a plurality of audiovisual recordings comprising presentations made during a videoconference and visual reactions of attendees. A data collection model is generated at a conference level, a topic level, and an attendee level. A level of interest of an attendee to a topic or a speaker is determined from data collected in the data collection model at the conference level, the topic level and the attendee level. The determined level of interest of attendees to topics or speakers is displayed in a data structure.

In additional embodiments, the data structure is an interrelationship graph. The attendees and the topics are represented in nodes of the interrelationship graph. A level of interest of an attendee to another attendee or a topic is represented in arcs of the interrelationship graph.

In further embodiments, attendees of each conference are stored at the conference level of the data collection model. Speaker and microexpression based feedbacks of attendees for each topic are stored at the topic level of the data collection model. Microexpression based feedbacks of each attendee are stored at the attendee level of the data collection model.

In yet further embodiment microexpressions are determined from the visual reactions of attendees. A feedback of an attendee to a topic or a speaker at a plurality of times is determined from the microexpressions.

In certain embodiments, the feedback of the attendee is a level of interest of the attendee to the topic or the speaker, where the feedback is determined by weighting the microexpressions.

In additional embodiments, a determination is made from the interrelationship graph of a relative interest of an attendee to each speaker of a plurality of speakers.

In further embodiments, a determination is made of a relative interest of an attendee to each topic of a plurality of topics from the interrelationship graph.

BRIEF DESCRIPTION OF THE DRAWINGS

Referring now to the drawings in which like reference numbers represent corresponding parts throughout:

FIG. 7 illustrates a block diagram that shows mechanisms for multi-dimensional analysis to generate an interrelationship graph, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Videoconferencing systems are popular because they allow a great degree of flexibility in interaction among participants. Additionally, videoconferencing systems save cost because participants do not have to travel to the same location for attending a meeting.

Data collected from video conferences may be analyzed for securing insights. Direct interactions including question and answer sessions, and indirect interactions including remote eye contacts and facial expressions may be analyzed. There are some mechanisms for data mining of videoconferencing data to obtain insights. For example, the conference content may be analyzed with speech to text and natural language processing technology. Emotional expressions of participants may be analyzed to collect feedbacks or evaluations of the participants of a conference.

Provided are mechanisms for analyzing videoconferencing data based on video content and emotions of participants to generate profiles for the participants, where the profiles describes relationship between participants, participant interest in meeting topics, etc. Facial expressions are collected at regular intervals and the emotions expressed in response to specific topics discussed during the meeting are analyzed. The feedback of a participant for a speaker is analyzed to measure a level of interest of the participant for the speaker based on facial expressions. The feedback of a participant for a topic may be analyzed to measure a level of interest of the participant for the topic. A top-down data collection model is generated at a conference level, topic level and participant level to generate an interrelationship graph that shows the level of interest among a plurality of participants and a plurality of topics. The embodiments improve data mining in a videoconferencing system by generating the interrelationship graph from the top-down data collection model. The interrelationship graph depicts the level of interest of a participant for a speaker and for a topic. As a result, the selection of speakers and topics for a meeting may be made, based on the levels of interest depicted in the interrelationship graph.

Exemplary Embodiments

Figure 1:
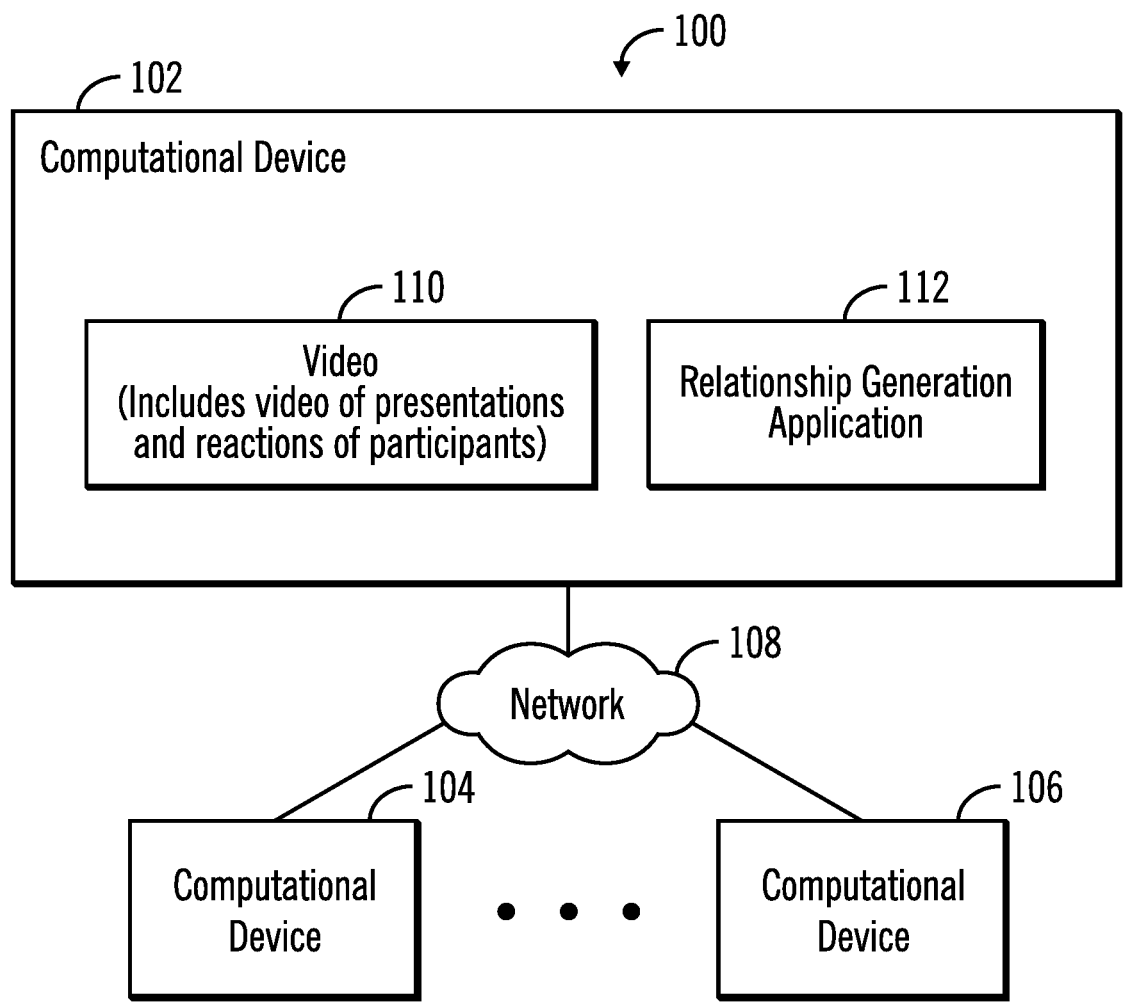
FIG. 1 illustrates a block diagram of a computing environment comprising a computational device coupled to a plurality of other computational devices over a network, in accordance with certain embodiments.

FIG. 1 illustrates a block diagram of a computing environment 100 comprising a computational device 102 coupled to a plurality of other computational devices 104, 106 over a network 108, in accordance with certain embodiments.

The computational devices 102, 104, 106 may comprise any suitable computational device including those presently known in the art, such as, hand held computer, a smartphone, a telephony device, a tablet computer, a palm top computer, a personal computer, a workstation, a server, a mainframe, a network appliance, a blade computer, a processing device, a controller, etc. The computational devices 102, 104, 106 may be coupled to any suitable network 108, such as, a local area network, the Internet, an intranet, etc. In certain embodiments, computational devices 102, 104, 106 may be elements in a cloud computing environment. Each of the computational devices 102, 104, 106 may be equipped with a high speed image sensor to capture video.

The computational device 102 may store one or more videos 110 of a conference that may be analyzed via a relationship generation application 112. In certain embodiments, the relationship generation application 112 may be implemented in software, firmware, hardware or any combination thereof. The videos 110 of the conference may be collected from one or more of the plurality of computational devices 104, 106, where the plurality of computational devices 104, 106 may be used by speakers and participants (e.g., attendees). The participants may view and listen to a presentation made by the speaker. Videos of the participants while listening to the speaker may be recorded at one or more of the computational devices 104, 106 and transmitted to the computational device 102 to aggregate in the videos 110 stored in the computational device 102. The videos 110 may also include the video presentation made by the speaker. For the purposes of this disclosure a video includes the sound that is transmitted with the video.

Figure 2:
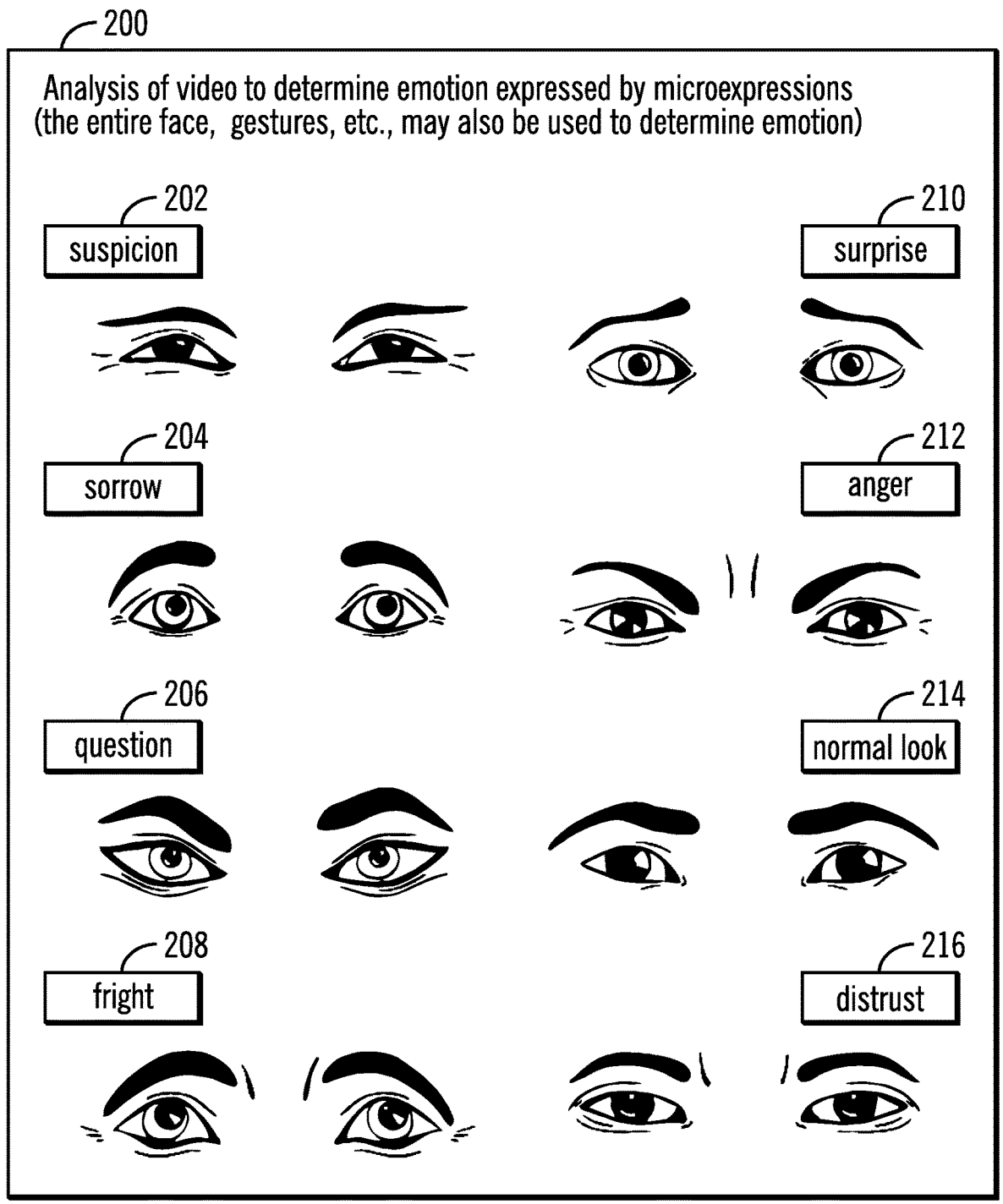
FIG. 2 illustrates a block diagram that shows how a relationship generation application may determine the emotions of an attendee from different types of microexpressions in one or more video frames by analyzing the video corresponding to a conference, in accordance with certain embodiments.

FIG. 2 illustrates a block diagram 200 that shows how in one phase of operation, the relationship generation application 112 may determine the emotions of a participant from different types of microexpressions in one or more video frames by analyzing the video 110 corresponding to a conference, in accordance with certain embodiments.

Microexpressions are facial expressions that may occur within a fraction of a second (e.g., within less than 0.5 second). Microexpressions are involuntary and may expose a participant's true emotions. Microexpressions are analyzed by the relationship generation application 112 to determine emotions expressed by a participant. FIG. 2 shows exemplary expressions denoting suspicion 202, sorrow 204, question 206, fright 208, surprise 210, anger 212, normal look 214, distrust 216, etc. In contrast to microexpressions that are involuntary responses (i.e., not performed under conscious control), voluntary responses are responses that are primarily performed under conscious control.

The microexpressions shown in FIG. 2 may result from voluntary and involuntary emotional responses that conflict with one another. The voluntary and involuntary emotional responses may occur when the brain of an individual responds appropriately to the stimuli that the individual experiences and the individual wishes to conceal the specific emotion. This results in the individual very briefly displaying a true emotion followed by a false emotion. The true emotion is captured by the microexpression. Unlike regular facial expressions, it is difficult or impossible to hide microexpression reactions as microexpressions are involuntary responses.

While FIG. 2 shows the determination of emotions based on video images of eyes and eyebrows, in alternative embodiments the entire face, gestures, etc., many also be used for the determination of emotions.

Figure 3:
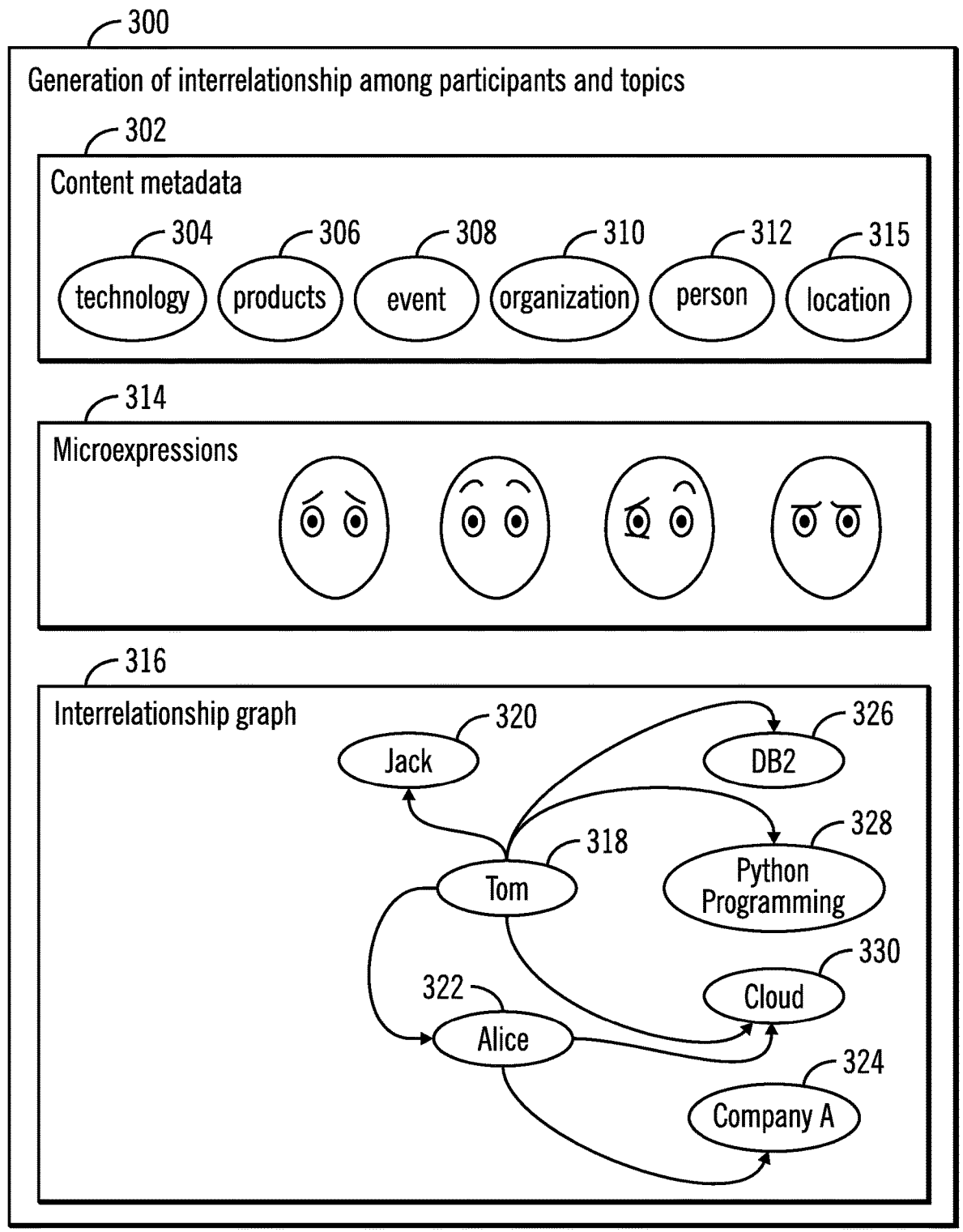
FIG. 3 illustrates a block diagram that shows how the relationship generation application may analyze content metadata and microexpressions to generate an interrelationship graph among participants and topics, in accordance with certain embodiments.

FIG. 3 illustrates a block diagram 300 that shows how in one phase of operation, the relationship generation application 112 may analyze content metadata 302 and microexpressions 314 to generate an interrelationship graph 316 that depicts connections depicting levels of interest among participants and topics, in accordance with certain embodiments.

The content metadata 302 may include metadata related to the video of the conference. For example, the content metadata 302 may indicate the technology 304 and products 306 about which a presentation is made during a videoconference. The content metadata 302 may also include the event name 308 of the presentation, and the organization 310 and the person 312 providing the presentation. The location 315 where the presentation is being recorded may also be provided in the content metadata 302.

The relationship generation application 112 analyzes the content metadata 302 and the microexpressions 314 of the participants to generate an interrelationship graph 316 that displays the interrelationships among the participants and the topics. For example, the interrelationship graph 316 may indicate that the participant Tom 318 likes listening to speakers Jack 320 and Alice 322, where Alice 322 is an employee of company A 324. Tom 318 also likes to listen to presentations on topics like DB2 326, Python Programming 328, and Cloud 330 (e.g., cloud computing). The interrelationship graph 316 also shows that Alice 322 likes presentation on topics like cloud 330. The interrelationship graph 316 may depict many different types of relationship and in certain additional embodiments the arcs between the nodes may be labelled with annotations to indicate the type or degree of relationship.

Figure 4:
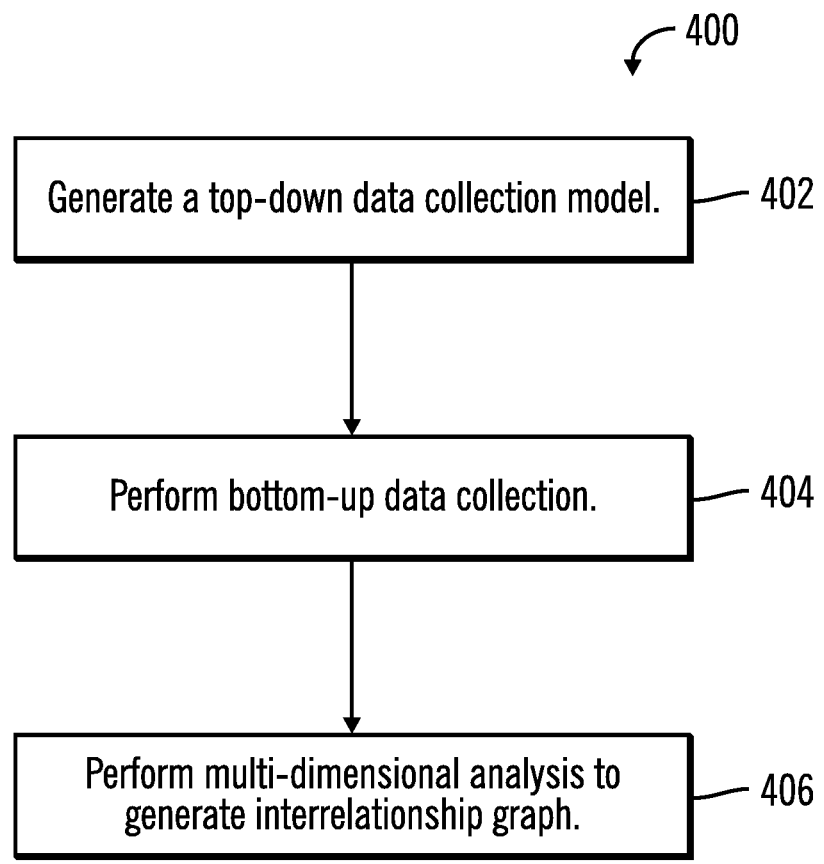
FIG. 4 illustrates a flowchart that shows operations for generating the interrelationship graph, in accordance with certain embodiments.

FIG. 4 illustrates a flowchart 400 that shows operations for generating the interrelationship graph 316 shown in FIG. 3, in accordance with certain embodiments. The operations shown in FIG. 4 may be performed by the relationship generator application 112 that executes in the computational device 102.

Control starts at block 402 in which the relationship generator application 112 generates a top-down data collection model, where the top-down data collection model stores information regarding conferences, topics, and attendees (i.e., participants). Control proceeds to block 404 in which the relationship generator application 112 performs bottom-up data collection by measuring feedback of attendees from the analysis of facial expressions and by collecting data at topic and conference levels, by analyzing the videos 110.

From block 404 control proceeds to block 406 in which the relationship generator application 112 determines connections between attendees and topics and determines connections among attendees and topics to generate the interrelationship graph 316.

Figure 5:
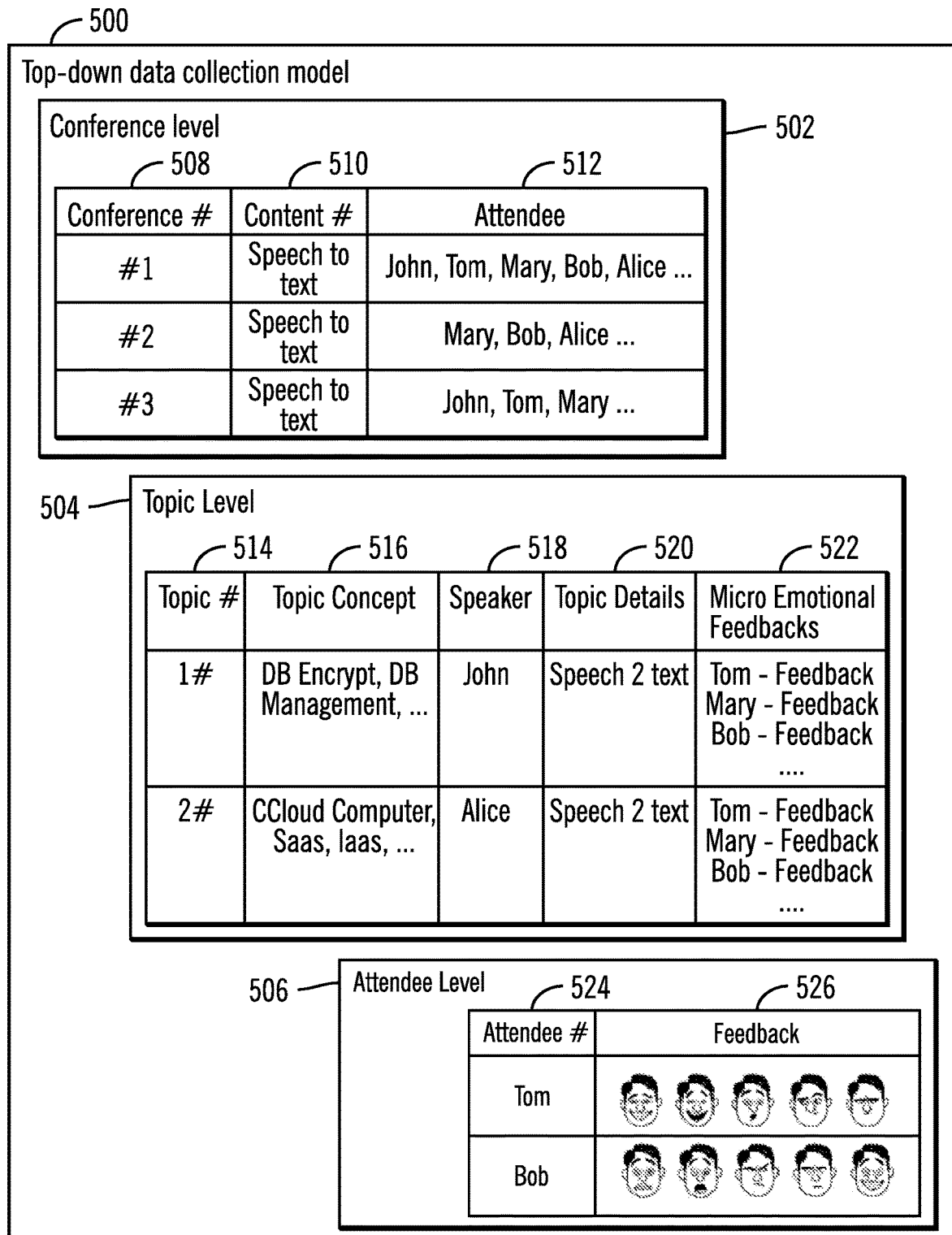
FIG. 5 illustrates a block diagram that shows a top-down data collection model, in accordance with certain embodiments.

FIG. 5 illustrates a block diagram 500 that shows the generation of a top-down data collection model, in accordance with certain embodiments. The operations and data structures shown in FIG. 5 may be performed or generated by the relationship generator application 112 that executes in the computational device 102.

The top-down data collection model 500 is generated in three levels: a conference level 502; a topic level 504, and an attendee level 506.

At the conference level 502 for each conference 508, the content 510 generated by converting the audio portion to text via a speech to text program is stored, together with the names of the attendees 512.

At the topic level 504 for each topic 514, the concept 516 corresponding to the topic, the speaker 518 on the topic, the topic details 520 generated via speech to text conversion, and the micro emotional feedbacks 522 of the attendees are stored. Topics may be directly defined by hosts, and may also be detected according to pre-defined rules. Additionally, a determination may be made as to whether there is a main speaker, or whether there are interactions among attendees.

At the attendee level 506, the names of the attendees 524 and the corresponding micro emotional feedbacks 526 at various times of the conference are stored.

Therefore, the top-down data collection model 500 stores content metadata 302 at a conference level 502, a topic level 504, and an attendee level 506 to facilitate the analysis of the content metadata 302.

Figure 6:
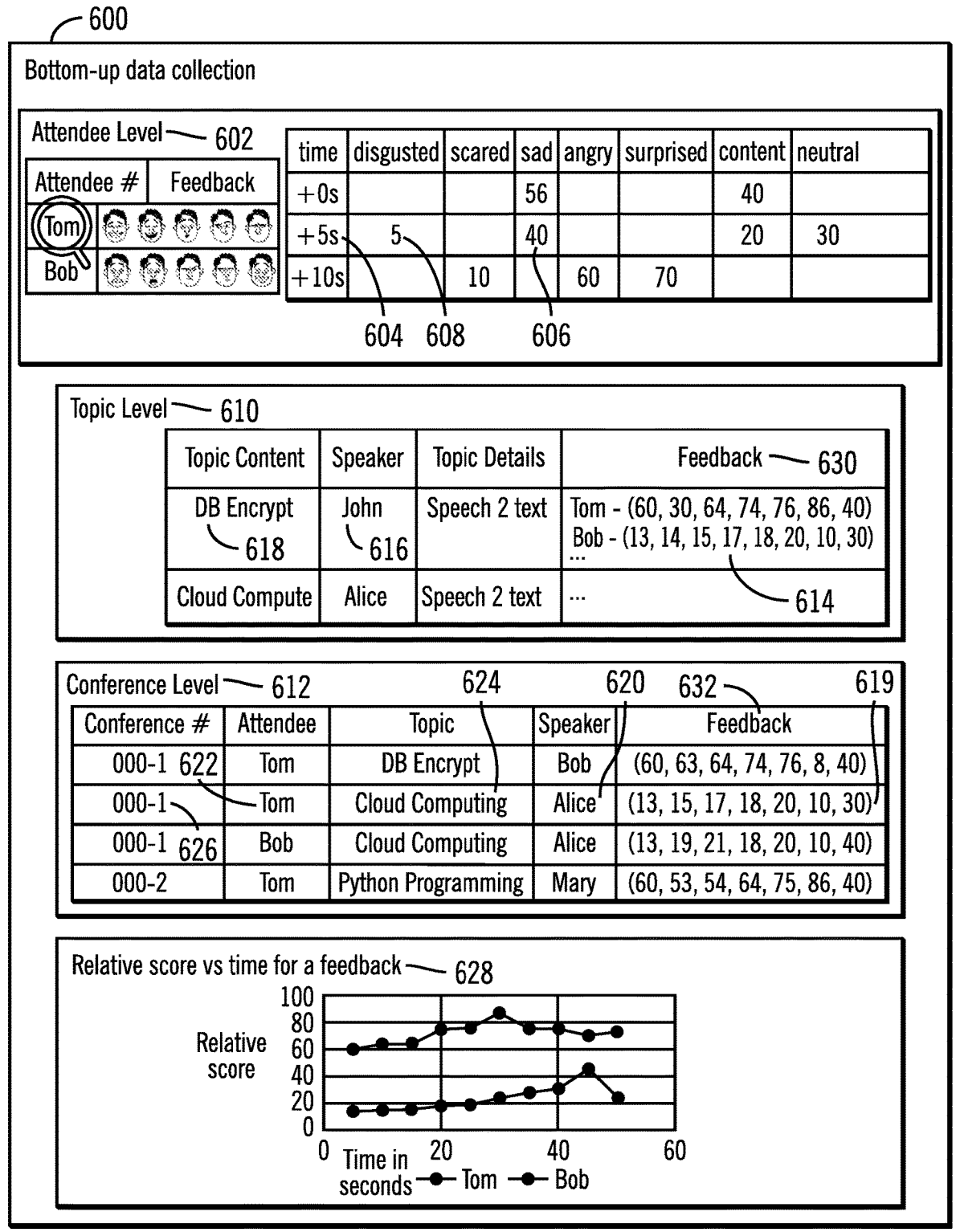
FIG. 6 illustrates a block diagram that shows mechanisms for bottom-up data collection, in accordance with certain embodiments.

FIG. 6 illustrates a block diagram 600 that shows mechanisms for bottom-up data collection, in accordance with certain embodiments. The operations and data structures shown in FIG. 6 may be performed or generated by the relationship generator application 112 that executes in the computational device 102.

Data is collected at the attendee level 602 to measure the feedback of attendees from facial expressions. This operations are based on facial expression analyzing technology (e.g., analysis of microexpressions) to read facial expressions at regular intervals, and analyze the type of a facial expression and the corresponding relative score of the facial expression. For example, at around 5 seconds from the start of the conference (shown via reference numeral 604), expressions of sadness are denoted by the relative score of 40 (shown via reference numeral 606), and expressions of disgust are shown via the relative score of 5 (shown via reference numeral 608) to indicate that sadness is a predominant response of an attendee in comparison to disgust at that time.

The data in the topic level 610 and conference level 612 is based on the data in attendee level 602. For example feedbacks of attendee Tom (the feedbacks are shown via reference numeral 614) to the speaker John 616 on the topic of database (DB) encryption 618 are shown. The feedbacks of attendee Tom 622 to the speaker Alice 620 on the topic of cloud computing 624 in conference 000-1 (shown via reference numeral 626) are shown via reference numeral 619.

A feedback calculation mechanism may provide a combined score that depicts a feedback determined from a plurality of microexpressions. For example, the levels of surprise, happiness, anger, and other emotions expressed by an attendee during a conference may be aggregated into a combined score that measures the level of interest of the attendee where the level of interest is the feedback. For example, a relative score vs. time graph 628 for attendees named Tom and Bob corresponding to a feedback (e.g., satisfaction with a talk or a speaker) at different instants of time are shown, and graphs such as graph 628 may be used to determine the feedbacks 630 at the topic level 610 and feedbacks 632 at the conference level 612.

FIG. 7 illustrates a block diagram 700 that shows mechanisms for multi-dimensional analysis to generate an interrelationship graph 706, in accordance with certain embodiments. The operations and data structures shown in FIG. 7 may be performed or generated by the relationship generator application 112 that executes in the computational device 102.

FIG. 7 shows analyzing connections between attendee and topic (reference numeral 702) and between two attendees (reference numeral 704) and representations of such connections in the interrelationship graph 706.

The interrelationship graph 706 is similar to the interrelationship graph 316 shown in FIG. 3 with the addition of an interest level labeling the arcs, where the interest level is based on collecting feedbacks of an attendee to a certain topic or a speaker to analyze whether the employee is interested on the topic or speaker or not. For example, the graph shows that that Tom 710 has an interest level of 60 (shown via reference numeral 708) in the speaker Jack 720.

The attendee-topic connections 702 depict all related feedbacks of an attendee to a topic, to analyze the relationship of an attendee to a topic. The attendee-attendee connections 704 depict all related feedbacks of an attendee to a speaker, to analyze the relationship that expresses the level of interest of an attendee to a speaker.

The interrelationship graph 706 shows the profiles of for attendees based on all data analyzed by the relationship generation application 112. The profiles may describe what topics an attendee is interested in, and who the attendee likes to listen to. For example, the interrelationship graph 706 indicates that Tom 710 has a relatively high interest in conferences on Python programming 712 in comparison to a conference on cloud related topics 714 as the arc 716 connecting the node Tom 710 to the node Python Programming 712 is labelled with a higher number (60) in comparison the arc 718 connecting the node Tom 710 to the node Cloud 714 which is labelled with a lower number (10). Tom 710 also has a greater interest in listening to Jack 720 in comparison to Alice 722 as the arc 724 between Tom 710 and Jack 720 is labelled 60 in comparison to the arc 726 between Tom 710 and Alice 722 which is labelled 50.

Figure 8:
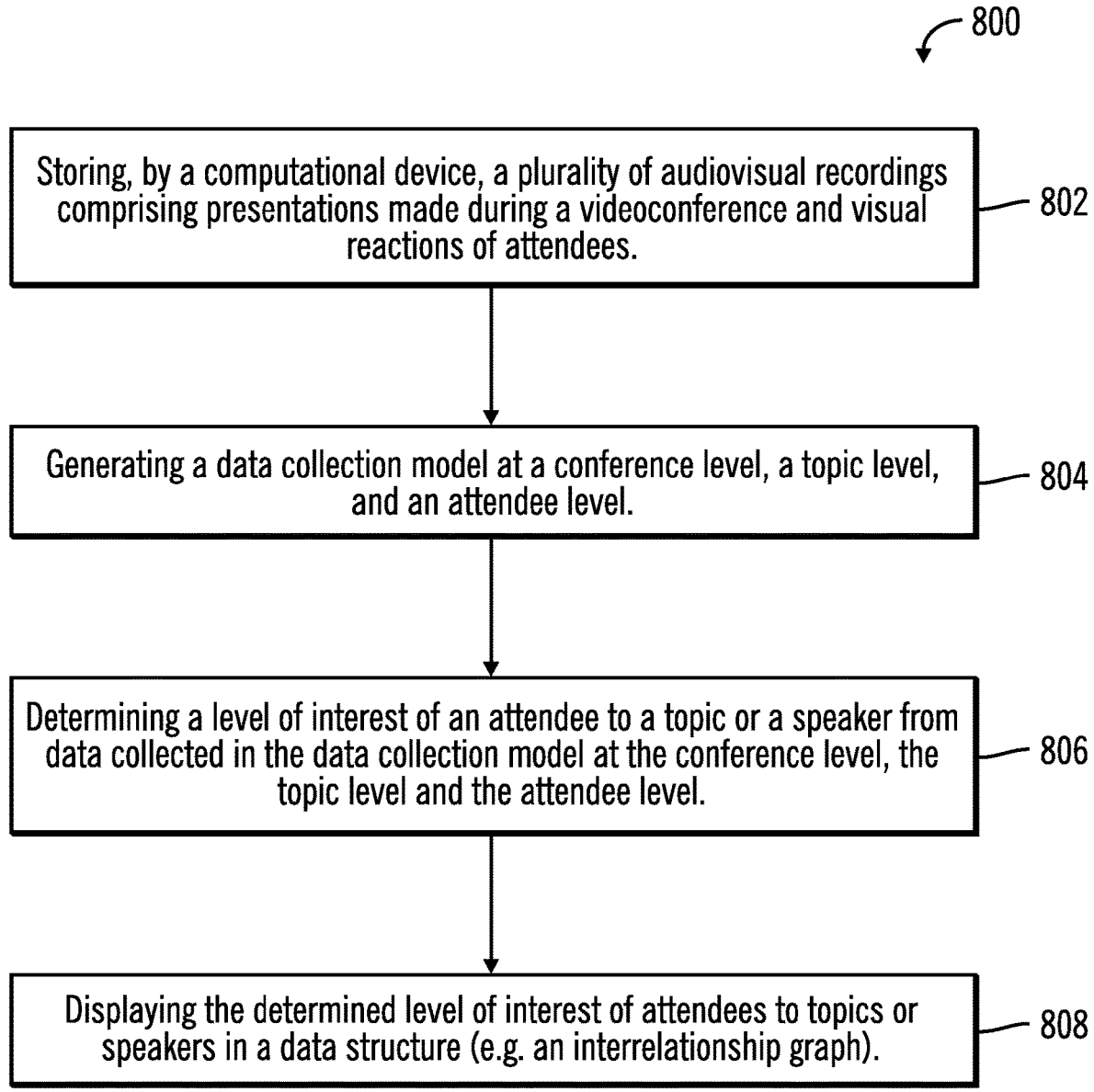
FIG. 8 illustrates a flowchart for generating interrelationships among various entities including participants, topics, etc., of a videoconferencing system, in accordance with certain embodiments.

FIG. 8 illustrates a flowchart for generating interrelationships among various entities including participants, topics, etc., of a videoconferencing system, in accordance with certain embodiments. The operations shown in FIG. 8 may be performed or generated by the relationship generator application 112 that executes in the computational device 102.

Control starts at block 802 in which a computational device 102 stores a plurality of audiovisual recordings 110 comprising presentations made during a videoconference and visual reactions of attendees. A data collection model 500 is generated (at block 804) at a conference level 502, a topic level 504, and an attendee level 506. A level of interest of an attendee to a topic or a speaker is determined (at block 806) from data collected in the data collection model at the conference level, the topic level and the attendee level. The determined level of interest of attendees to topics or speakers is displayed (at block 808) in a data structure 706 (e.g., the interrelationship graph 706).

The attendees and the topics are represented in nodes (e.g., 710, 720) of the interrelationship graph 706. A level of interest of an attendee to another attendee or a topic is represented in arcs (e.g., arcs 724, 726) of the interrelationship graph 706. Attendees of each conference are stored at the conference level 502 of the data collection model 500. Speaker and micro expression based feedbacks of attendees for each topic are stored at the topic level 504 of the data collection model 500. Microexpression based feedbacks of each attendee are stored at the attendee level 506 of the data collection model 500. The microexpressions are determined from the visual reactions of attendees. A feedback of an attendee to a topic or a speaker at a plurality of times is determined from the microexpressions. In certain embodiments, the feedback of the attendee is a level of interest of the attendee to the topic or the speaker, where the feedback is determined by weighting the microexpressions.

Therefore, FIGS. 1-8 illustrate certain embodiments in which a top-down data collection model is used to store data at the conference level, topic level, and attendee level is used to determine the level of interest of attendees of a conference to speakers or topics. The data stored in the data collection model may be generated from analysis of microexpressions of attendees to speakers or topics to determine the level of interest of the attendee to a speaker or a topic. Using involuntary emotional expressions (i.e., microexpressions) over conventional emotional expressions may result in determining the level of interest of attendees of a conference to speakers or topics more accurately as the involuntary emotional expressions are difficult or impossible to hide.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
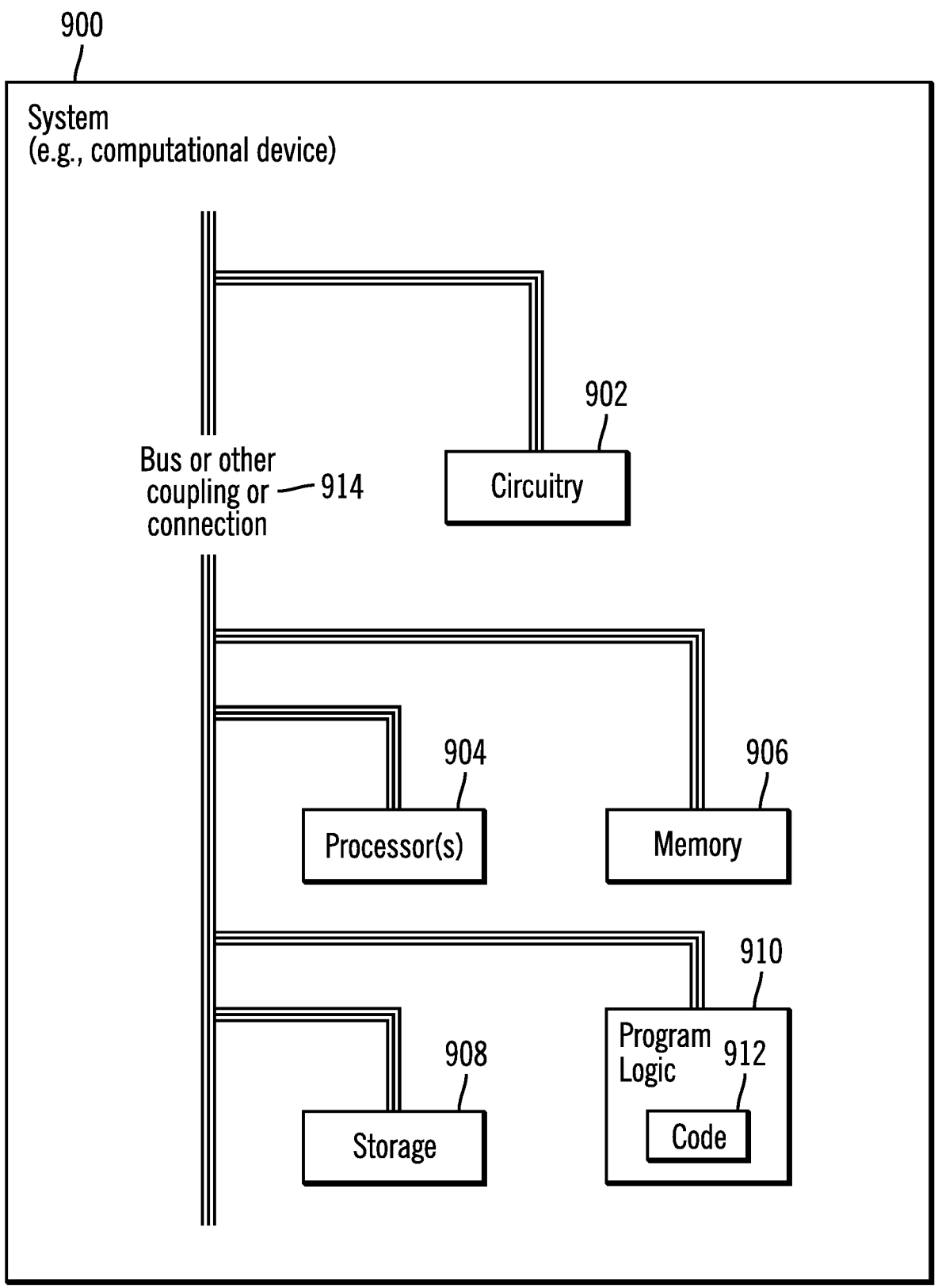
FIG. 9 shows certain elements that may be included in the computational devices as described in FIGS. 1-8, in accordance with certain embodiments.

FIG. 9 illustrates a block diagram of a system 900 that shows certain elements that may be included in the computational device 102 or other computational devices 104, 106 in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. One or more of the components in the system 900 may communicate via a bus or via other coupling or connection 914. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   storing, by a computational device, a plurality of audiovisual recordings comprising presentations made during a videoconference and visual reactions of attendees;
   generating a data collection model at a conference level, a topic level, and an attendee level, wherein at the conference level, content generated by converting an audio portion to text via a speech to text program is stored together with names of the attendees for the videoconference, wherein at the topic level, corresponding to a topic, a speaker on the topic, topic details generated via the speech to text program and micro emotional feedbacks of the attendees are stored, wherein at the attendee level, names of attendees and corresponding micro emotional feedbacks at various times of the videoconference are stored, wherein micro emotional feedbacks are weighted to determine a predominant response of a selected attendee, and wherein micro emotional feedbacks are involuntary feedbacks of the selected attendee;
   determining a level of interest of an attendee to a topic or a speaker from data collected in the data collection model at the conference level, the topic level and the attendee level; and
   displaying the determined level of interest of attendees to topics or speakers in a data structure.

2. The method of claim 1, wherein the data structure is an interrelationship graph, the method further comprising:
   representing the attendees and the topics in nodes of the interrelationship graph; and
   representing a level of interest of an attendee to another attendee or a topic in arcs of the interrelationship graph.

3. The method of claim 2, the method further comprising:
   storing attendees of each conference at the conference level of the data collection model;
   storing speaker and microexpression based feedbacks of attendees for each topic at the topic level of the data collection model; and
   storing microexpression based feedbacks of each attendee at the attendee level of the data collection model.

4. The method of claim 3, the method further comprising:
   determining microexpressions from the visual reactions of attendees; and
   determining a feedback of an attendee to a topic or a speaker at a plurality of times from the microexpressions.

5. The method of claim 4, wherein the feedback of the attendee is a level of interest of the attendee to the topic or the speaker, and wherein the feedback is determined by weighting the microexpressions.

6. The method of claim 2, the method further comprising:
   determining from the interrelationship graph a relative interest of an attendee to each speaker of a plurality of speakers.

7. The method of claim 6, the method further comprising:
   determining from the interrelationship graph a relative interest of an attendee to each topic of a plurality of topics.

8. A system, comprising:
   a memory; and
   a processor coupled to the memory, wherein the processor performs operations, the operations comprising:
   storing a plurality of audiovisual recordings comprising presentations made during a videoconference and visual reactions of attendees;
   generating a data collection model at a conference level, a topic level, and an attendee level, wherein at the conference level, content generated by converting an audio portion to text via a speech to text program is stored together with names of the attendees for the videoconference, wherein at the topic level, corresponding to a topic, a speaker on the topic, topic details generated via the speech to text program and micro emotional feedbacks of the attendees are stored, wherein at the attendee level, names of attendees and corresponding micro emotional feedbacks at various times of the videoconference are stored, wherein micro emotional feedbacks are weighted to determine a predominant response of a selected attendee, and wherein micro emotional feedbacks are involuntary feedbacks of the selected attendee;
   determining a level of interest of an attendee to a topic or a speaker from data collected in the data collection model at the conference level, the topic level and the attendee level; and
   displaying the determined level of interest of attendees to topics or speakers in a data structure.

9. The system of claim 8, wherein the data structure is an interrelationship graph, the operations further comprising:
   representing the attendees and the topics in nodes of the interrelationship graph; and
   representing a level of interest of an attendee to another attendee or a topic in arcs of the interrelationship graph.

10. The system of claim 9, the operations further comprising:
    storing attendees of each conference at the conference level of the data collection model;
    storing speaker and microexpression based feedbacks of attendees for each topic at the topic level of the data collection model; and
    storing microexpression based feedbacks of each attendee at the attendee level of the data collection model.

11. The system of claim 10, the operations further comprising:
    determining microexpressions from the visual reactions of attendees; and
    determining a feedback of an attendee to a topic or a speaker at a plurality of times from the microexpressions.

12. The system of claim 11, wherein the feedback of the attendee is a level of interest of the attendee to the topic or the speaker, and wherein the feedback is determined by weighting the microexpressions.

13. The system of claim 9, the operations further comprising:

determining from the interrelationship graph a relative interest of an attendee to each speaker of a plurality of speakers.

14. The system of claim 13, the operations further comprising:
determining from the interrelationship graph a relative interest of an attendee to each topic of a plurality of topics.

15. A computer program product, the computer program product comprising a computer readable storage medium having computer readable program code embodied therewith, the computer readable program code configured to perform operations on a processor, the operations comprising:
storing a plurality of audiovisual recordings comprising presentations made during a videoconference and visual reactions of attendees;
generating a data collection model at a conference level, a topic level, and an attendee level, wherein at the conference level, content generated by converting an audio portion to text via a speech to text program is stored together with names of the attendees for the videoconference, wherein at the topic level, corresponding to a topic, a speaker on the topic, topic details generated via the speech to text program and micro emotional feedbacks of the attendees are stored, wherein at the attendee level, names of attendees and corresponding micro emotional feedbacks at various times of the videoconference are stored, wherein micro emotional feedbacks are weighted to determine a predominant response of a selected attendee, and wherein micro emotional feedbacks are involuntary feedbacks of the selected attendee;
determining a level of interest of an attendee to a topic or a speaker from data collected in the data collection model at the conference level, the topic level and the attendee level; and
displaying the determined level of interest of attendees to topics or speakers in a data structure.

16. The computer program product of claim 15, wherein the data structure is an interrelationship graph, the operations further comprising:
representing the attendees and the topics in nodes of the interrelationship graph; and
representing a level of interest of an attendee to another attendee or a topic in arcs of the interrelationship graph.

17. The computer program product of claim 16, the operations further comprising:
storing attendees of each conference at the conference level of the data collection model;
storing speaker and microexpression based feedbacks of attendees for each topic at the topic level of the data collection model; and
storing microexpression based feedbacks of each attendee at the attendee level of the data collection model.

18. The computer program product of claim 17, the operations further comprising:
determining microexpressions from the visual reactions of attendees; and
determining a feedback of an attendee to a topic or a speaker at a plurality of times from the microexpressions.

19. The computer program product of claim 18, wherein the feedback of the attendee is a level of interest of the attendee to the topic or the speaker, and wherein the feedback is determined by weighting the microexpressions.

20. The computer program product of claim 16, the operations further comprising:
determining from the interrelationship graph a relative interest of an attendee to each speaker of a plurality of speakers; and
determining from the interrelationship graph a relative interest of an attendee to each topic of a plurality of topics.

* * * * *